US009928630B2

(12) United States Patent
Rakshit

(10) Patent No.: US 9,928,630 B2
(45) Date of Patent: Mar. 27, 2018

(54) HIDING SENSITIVE CONTENT VISIBLE THROUGH A TRANSPARENT DISPLAY

(71) Applicant: INTERNATIONAL BUSINESS MACHINES CORPORATION, Armonk, NY (US)

(72) Inventor: Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/219,643

(22) Filed: Jul. 26, 2016

(65) Prior Publication Data
US 2018/0033171 A1 Feb. 1, 2018

(51) Int. Cl.
G06T 19/00 (2011.01)
G06K 9/00 (2006.01)
G06T 11/60 (2006.01)

(52) U.S. Cl.
CPC .......... *G06T 11/60* (2013.01); *G06K 9/00335* (2013.01); *G06K 9/00597* (2013.01); *G06K 9/00624* (2013.01)

(58) Field of Classification Search
CPC .. G09G 3/2003; G09G 3/3225; G09G 3/3607; G09G 5/10; G02F 1/13338; H01L 27/3232
USPC .... 345/619, 629, 9, 633; 382/212, 214, 282, 382/283; 715/866; 348/46
See application file for complete search history.

(56) References Cited

U.S. PATENT DOCUMENTS

| 6,166,744 A | 12/2000 | Jaszlics et al. |
| 6,507,428 B1 | 1/2003 | Heuer et al. |
| 8,279,510 B2 | 10/2012 | Kuhlman et al. |
| 8,493,364 B2 | 7/2013 | Charlier et al. |
| 9,058,509 B1 * | 6/2015 | Yang ........................ G06F 21/84 |
| 9,733,881 B2 * | 8/2017 | Rakshit ................. G06F 3/1423 |
| 2008/0303842 A1 * | 12/2008 | Okamoto ................ G06F 3/048 345/629 |

(Continued)

OTHER PUBLICATIONS

IP.com, "Method and System for Evaluating Confidentiality of Content to be Displayed on Different Areas of Transparent Flexible Display Devices", IP.com Prior Art Database Technical Disclosure, Nov. 24, 2014, pp. 1-6.*

(Continued)

*Primary Examiner* — Chante Harrison
(74) *Attorney, Agent, or Firm* — Ronald A. Kaschak; Matthew M. Hulihan; Heslin Rothenberg Farley & Mesiti PC

(57) ABSTRACT

Facilities for hiding sensitive content visible through a transparent display. An example method includes identifying sensitive content adjacent to a first side of a transparent display device, detecting a viewing direction to the sensitive content through the transparent display device from a position adjacent to a second side of the transparent display device, determining, based at least in part on the detected viewing direction, a display area of the transparent display device through which at least a portion of the sensitive content is visible from the position adjacent to the second side of the transparent display device, and presenting, in the display area, digital content at least partially blocking the sensitive content from view from the position adjacent to the second side of the transparent display device.

19 Claims, 8 Drawing Sheets

(56) References Cited

U.S. PATENT DOCUMENTS

| | | | |
|---|---|---|---|
| 2009/0237738 A1 | 9/2009 | Yang et al. | |
| 2010/0220043 A1* | 9/2010 | Broughton | G02F 1/1323 345/87 |
| 2010/0245387 A1 | 9/2010 | Bachelder et al. | |
| 2010/0295755 A1* | 11/2010 | Broughton | G02F 1/1323 345/32 |
| 2011/0211040 A1 | 9/2011 | Lindemann et al. | |
| 2011/0242090 A1 | 10/2011 | Keating et al. | |
| 2012/0313839 A1 | 12/2012 | Smithwick et al. | |
| 2014/0139458 A1 | 5/2014 | Premutico et al. | |
| 2014/0325678 A1* | 10/2014 | Kotla | G06F 21/62 726/28 |
| 2014/0368537 A1* | 12/2014 | Salter | G06T 19/006 345/633 |
| 2015/0363966 A1 | 12/2015 | Wells et al. | |
| 2016/0240050 A1* | 8/2016 | Block | G07F 19/211 |
| 2017/0060512 A1* | 3/2017 | Rakshit | G06F 3/1423 |

OTHER PUBLICATIONS

Priva-Lite Saint-Gobain Glass Exprover, http://exprover.saint-gobain-glass.com/product/286/priva-lite#tabs-2, 5 pgs.

Priva-Lite Glass FAQ, http://www.privalite.eu/products/faq/#toggle-id-3, 5 pgs.

"Switchable glass for modular partitioning and privacy management", http://www.archi-europe.com/buildingsolutions/Glassolutions/2014/nb1/pdf/PRIVA_LITE_EN.pdf, 6 pgs.

Ebay listing, "Computer Screen Privacy Filters", http://www.ebay.com/sch/Computer-Screen-Privacy-Filters/170597/bn_, 6 pgs.

DailyMail.com, "Technology . . . or magic? Samsung shows off video of transparent, flexible screen—with 3D so real, it looks like you can touch it", http://www.dailymail.co.uk/sciencetech/article-2070741/Samsungs-transparent-flexible-screen-3D-real-looks-like-touch-it.html, updated Dec. 7, 2011, 7 pgs.

IP.com, "Smart Windows for Energy Efficiency", IP.com No. 000222798, 4 pgs.

iTunes Preview, "EasyMeasure—Measure with your Camera!", https://itunes.apple.com/in/app/easymeasure-measure-your-camera!/id349530105?mt=8, updated Apr. 12, 2016, 2 pgs.

Google Play, "Smart Measure—Android Apps on Google Play", https://play.google.com/store/apps/details?id=kr.sira.measure&hl=en, updated Apr. 19, 2016, 3 pgs.

David Lindlbauer et al., "Tracs: Transparency Control for See-Through Displays", UIST'14, Oct. 5-8, 2014, Honolulu, HI, pp. 657-661.

Sebastian Anthony, "Jaguar Concept Car Has Transparent Pillars, Windshield HUD With Mario Kart-Like 'Ghost' Mode", Dec. 15, 2014, 4 pages, http://www.extremetech.com/extreme/195951-jaguar-concept-car-has-tansparent-pillars-advanced-hud-with-mario-kart-like-ghost-mode.

Li, Jiannan, et al. "Interactive two-sided transparent displays: designing for collaboration." Proceedings of the 2014 conference on Designing interactive systems. ACM, 2014.

Notice of Allowance in U.S. Appl. No. 14/839,045, filed Mar. 31, 2017, 9 pgs.

* cited by examiner

HIDING SENSITIVE CONTENT VISIBLE THROUGH A TRANSPARENT DISPLAY

BACKGROUND

Interactions between individuals sometimes take place through a glass panel provided for security or other purposes. Banks, airports, ticket counters, and visa/passport offices are example venues in which a customer/user might interact with an employee, teller, support expert, or the like (referred to herein as a "support person") across a transparent panel. Many times the support person works with confidential documents and/or performs confidential actions like counting money when interacting with the customer. Consequently, the documents, actions, and other content may be viewable through the transparent panel. This content may or may not be sensitive with respect to the customer and is likely to be sensitive with respect to other individuals viewing from the customer's side of the glass who are not privileged to view that content.

SUMMARY

What is needed is a facility for maintaining privacy of sensitive content adjacent to one side of a transparent pane from individuals adjacent to the other side of the transparent pane. Shortcomings of the prior art are overcome and additional advantages are provided through the provision of a computer-implemented method. The method identifies sensitive content adjacent to a first side of a transparent display device. The method detects a viewing direction to the sensitive content through the transparent display device from a position adjacent to a second side of the transparent display device. Additionally, the method determines, based at least in part on the detected viewing direction, a display area of the transparent display device through which at least a portion of the sensitive content is visible from the position adjacent to the second side of the transparent display device. The method then presents, in the display area, digital content at least partially blocking the sensitive content from view from the position adjacent to the second side of the transparent display device.

Further, a computer program product including a computer readable storage medium readable by a processor and storing instructions for execution by the processor is provided for performing a method. The method identifies sensitive content adjacent to a first side of a transparent display device. The method detects a viewing direction to the sensitive content through the transparent display device from a position adjacent to a second side of the transparent display device. Additionally, the method determines, based at least in part on the detected viewing direction, a display area of the transparent display device through which at least a portion of the sensitive content is visible from the position adjacent to the second side of the transparent display device. The method then presents, in the display area, digital content at least partially blocking the sensitive content from view from the position adjacent to the second side of the transparent display device.

Yet further, a computer system is provided that includes a memory and a processor in communications with the memory, wherein the computer system is configured to perform a method. The method identifies sensitive content adjacent to a first side of a transparent display device. The method detects a viewing direction to the sensitive content through the transparent display device from a position adjacent to a second side of the transparent display device. Additionally, the method determines, based at least in part on the detected viewing direction, a display area of the transparent display device through which at least a portion of the sensitive content is visible from the position adjacent to the second side of the transparent display device. The method then presents, in the display area, digital content at least partially blocking the sensitive content from view from the position adjacent to the second side of the transparent display device.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
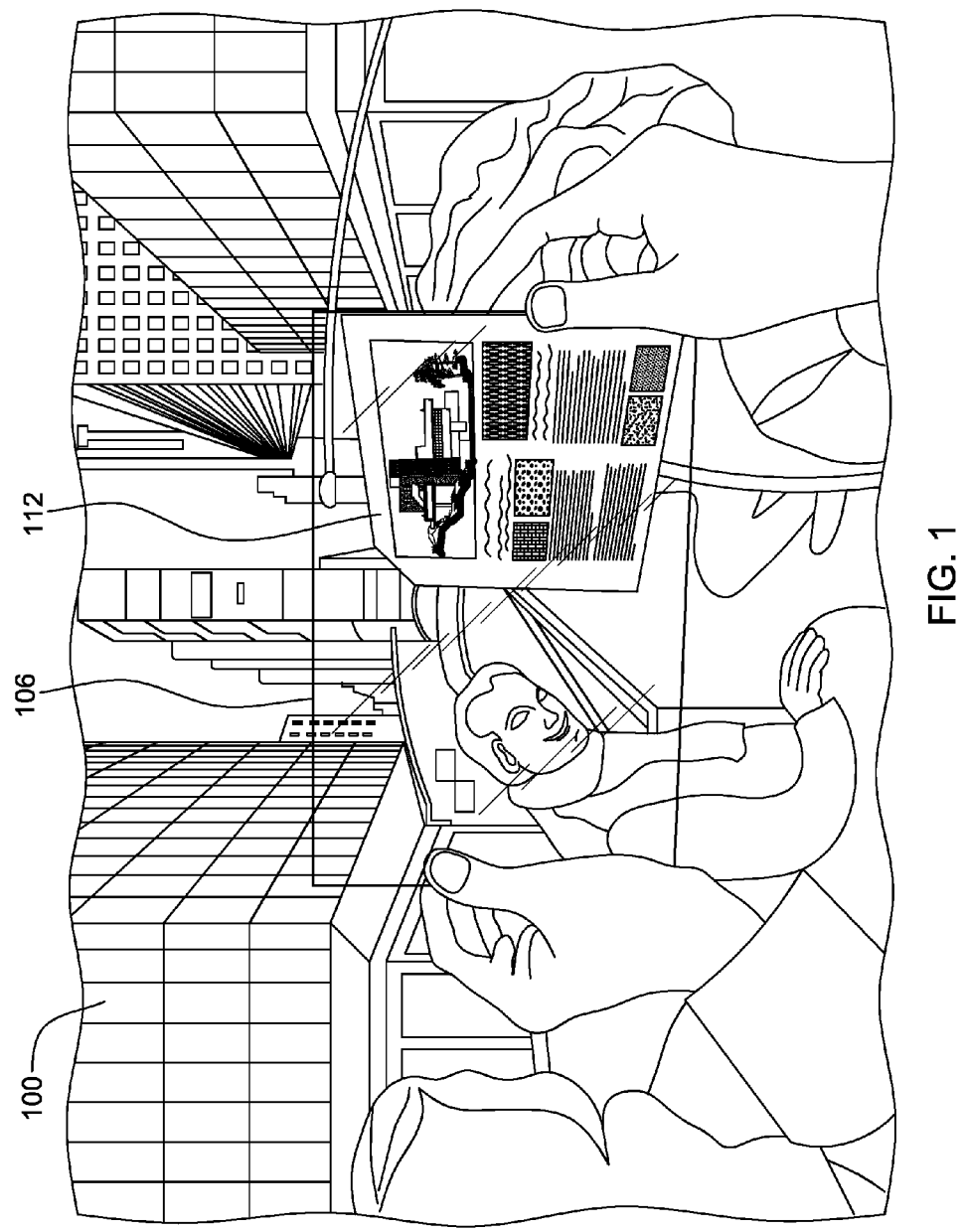
FIG. 1 depicts an example virtual display plane established on a physical display.

Described herein are facilities to automatically hide sensitive content (activity, objects, documents, material, matter, user actions, etc.) adjacent to one side of a transparent display from view from the other side of the transparent display by interposing digital content on portion(s) of the display in user line(s) of sight to the sensitive content. Virtual display screen(s) (one or more partial or full screen (s)) are established on a transparent display and present digital content to hide the confidential content and/or actions ("sensitive content" herein) adjacent to the other side of the display. In some embodiments, the digital content presented on the transparent display on a virtual display plane comprise advertisement(s).

Sensitive content adjacent to one side of a transparent display can be hidden from the view(s) of a particular user or users looking through the transparent display. In some examples, this is dependent on a security profile of each user—the security profile indicative of the user's privilege level for viewing the sensitive content. Some example venues in which aspects described herein may be applied include at a government visa desk, bank teller window, or passport office, where a support person typically serves one customer/user at a time or a group of users having a same security profile, for instance a husband and wife who are working together with the support person.

In cases where a non-privileged individual is close to a transparent display through which a customer works with a support person, facilities can identify the non-privileged individual and interpose digital content on the transparent display in the non-privileged individual's line of sight to the sensitive content through the transparent display. Depending on the positioning of the customer relative to the non-privileged individual, the digital content blocking the sensitive content from view by the non-privileged individual may not block the line of sight of the customer, which is a different line of sight to the sensitive content. In other examples, the customer is non-privileged to view sensitive content on the other side of the transparent display, in which case the digital content will be interposed in the customer's line of sight. An example situation in which a customer may not be privileged to view the sensitive content is in a banking situation where the teller opens a money drawer to count a requested amount of cash. The volume of money maintained in a money drawer may be considered sensitive to the bank.

An overview of an example embodiment is as follows:

A transparent display device (also referred to herein a "transparent display", "translucent display" or "see-through display") is installed as a divider between two individuals ("users"), for instance a customer and a support person. Such displays are typically made of transparent/translucent organic light-emitting diodes (OLEDs) between glass panels.

Camera(s) and other types of sensors, such as proximity sensors, are also installed in the environment, room, area, etc. to track the activities of individuals, documents, and other objects in the vicinity that may be viewable through the transparent display. Software can identify the sensitive content, such as actions, gestures, or activities of the support person, and documents, graphics, logos, objects, and other items that may be deemed sensitive, e.g. confidential and/or private. This may be done through image recognition, for example, by analyzing images and/or video. Other methods of identifying sensitive content are possible. For instance, signal emitting tags may be placed on sensitive objects and their presence detected by appropriate receivers in order to identify positioning of the sensitive object and therefore when the sensitive object may be viewable.

In any event, camera(s) installed at/facing the customer side of the transparent display also identify an individual's viewing, focus and/or facial direction. The individual may be the customer and/or others who may or may not be affiliated with the customer. One or more virtual display screens/planes may be established on the transparent display in the display area(s) through which at least some of the sensitive content is visible from the individual's vantage point. These virtual display planes are opaque enough to hide, block, or at least obscure the sensitive content from view because they display digital content. Thus, appropriate digital content, such as an advertisement, can be displayed in the virtual opaque display screen and the digital content can overlay the sensitive content in an individual's line of sight through the transparent display to the sensitive content, so that individual side is unable to view the sensitive content.

The shape and dimension of the virtual display portion can depend on, i.e. generally conform to or be configured to block, the shape and dimension of the sensitive content. The shape of the virtual display portion can be any desired shape, such as a semicircular shape plane or a straight display plane, as examples. This may be a function of the dimension and area covered by the sensitive content. Additionally, as noted, there may be multiple such virtual displays created corresponding to each of several different individuals on the other side of the transparent display whose views to the sensitive content are to be blocked. Alternatively, a full screen virtual display can be created.

FIG. 1 illustrates creation of a virtual display plane. Specifically, FIG. 1 depicts an example of a virtual display plane established on a physical display. In environment 100, a user holds out physical display plane 106, which is a at least partially transparent, as is evident because the scene on the other side of the display plane 106 is visible. Virtual display plane 112 is programmatically created on the physical display and displays content—an article in this example. It is seen that the virtual display plane 112 is presented with a skew to create the impression of depth. It is oriented at an angle with respect to a surface of the physical plane 106. Skewing the virtual display plane gives it a three-dimensional appearance. The content displayed 'on the virtual display plane' is content presented in the area of the virtual display plane and with a skew in an angular direction/distance away from the user. The virtual display plane itself can be made transparent or opaque, lending control over the transparency level of the display area where the digital content is presented.

Figure 2:
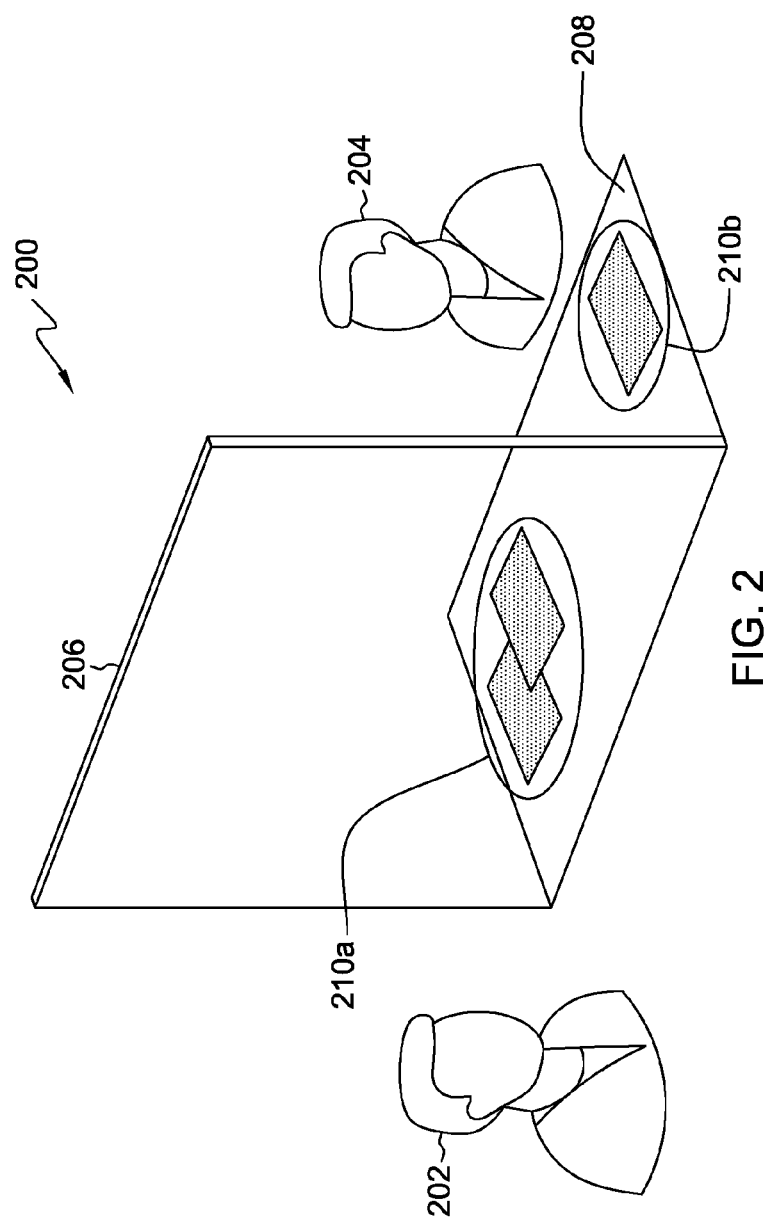
FIG. 2 depicts an environment in which sensitive content is visible through a transparent plane.

FIG. 2 depicts an environment in which sensitive content is visible through a transparent plane. Individuals 202 and 204, for instance a customer and bank teller respectively, interact across a glass or other transparent panel 206 in environment 200. The panel may have several sides. Two opposing sides are of particular relevance, i.e. one side facing user 204 and another side facing user 202. Teller 204 works adjacent to the one side of the panel 206 at a desk 208 on which documents 210a and 210b are kept. Customer 202 adjacent to a second side of the panel 206 looks through panel 206 when interacting with teller 204. By "adjacent to" is meant 'at' or 'near' such that a view to something on the opposing side of the panel extends through the panel.

In this example, documents 210a, 210b are considered confidential and therefore sensitive. In some situations, the confidential papers are not sensitive with respect to customer 202 but are with respect to others and therefore the papers should not be viewable to others adjacent to the customer side of the panel 206. In other situations, the papers 210a, 210b are to be kept hidden from view by customer 202.

Figure 3A:
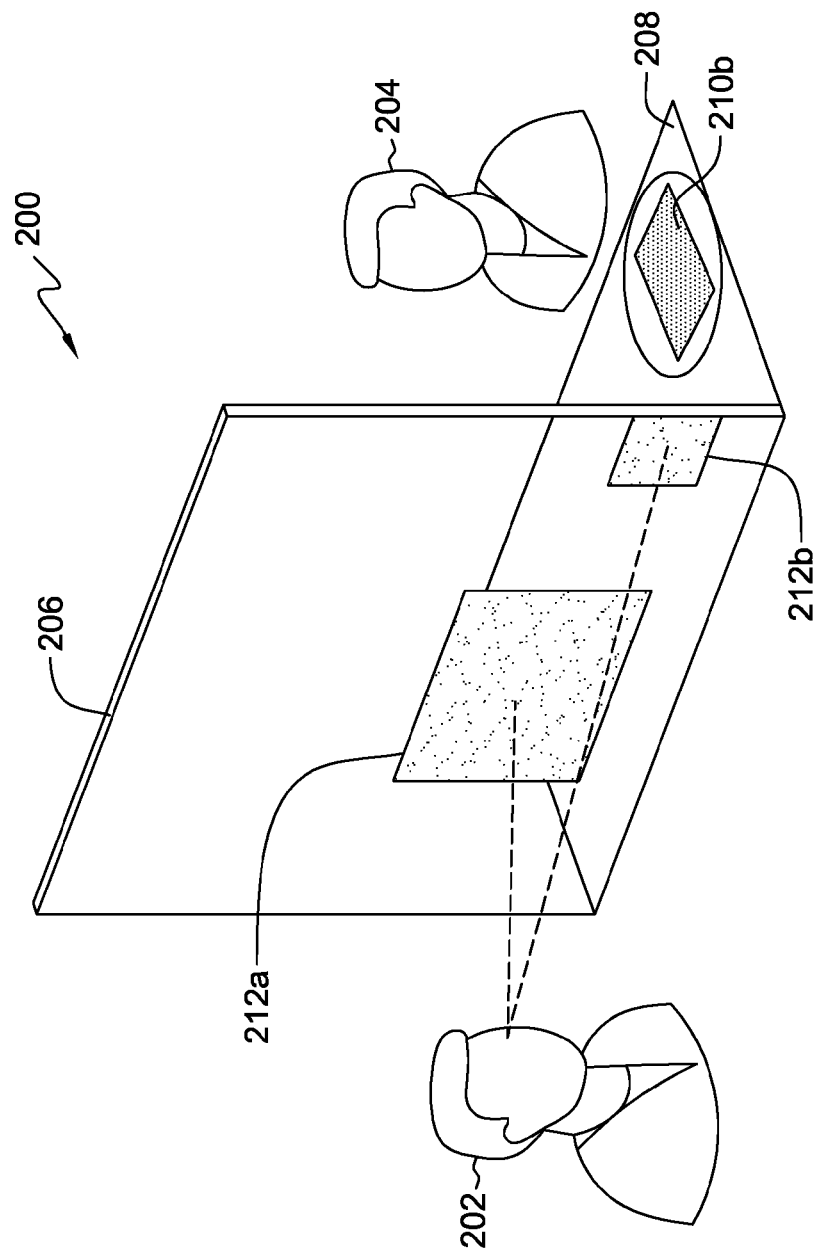
FIG. 3A-3B depict an example of blocking sensitive content from view in an environment of FIG. 2, in accordance with aspects described herein.
Figure 3B:
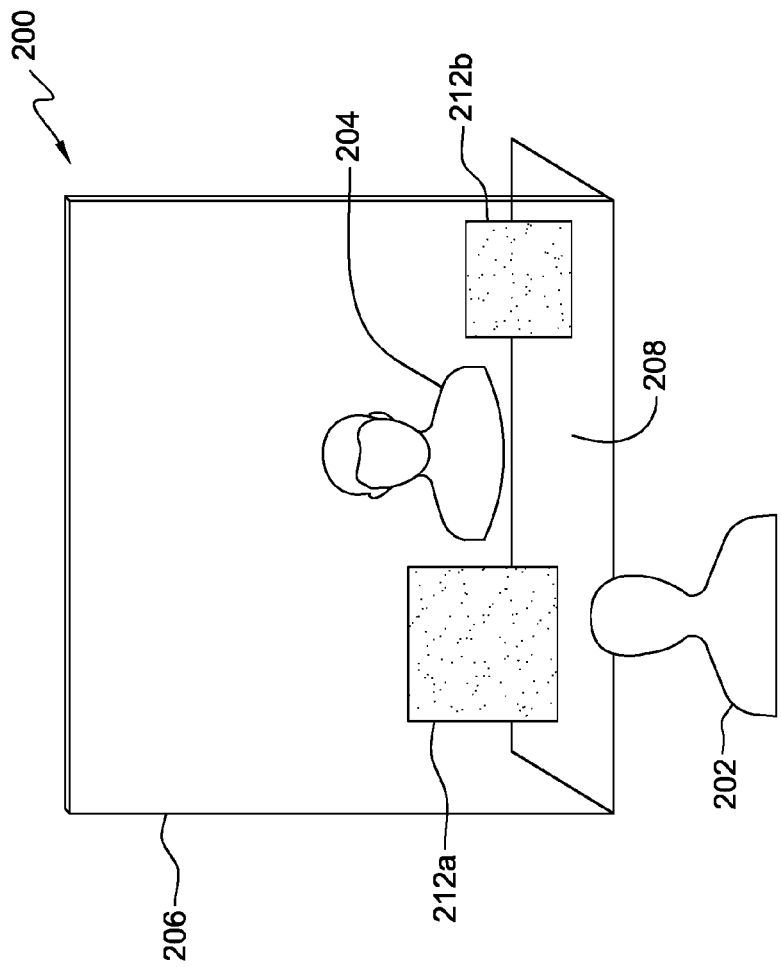

FIG. 3A-3B depict and example of blocking sensitive content from view in an environment such as that of FIG. 2, in accordance with aspects described herein. In an example in which interactions between individuals take place between a glass panel, computer system(s) supporting the activities of the individuals, e.g. a customer and a service provider/representative, are often independent of the glass panel. However, it may be desired that the interface (e.g. glass panel or other interface) be made of an at least partially transparent display/display device of a computer system. The representative and customer may interact through the interface. The interface can serve multiple purposes including providing physical separation between the individuals while maintaining transparency for the individuals to view each other, and providing one or more display devices of one or more computing systems supporting the individuals' activities. Within this context, aspects described herein manage user ability to view sensitive content through the transparent display.

The sensitive content may be identified, and a check may be made as to whether the identified sensitive content is confidential for a given individual. If so, a virtual display can be created and advertisement(s) (as an example) may be displayed to hide the sensitive content. In other examples, effects such as blurs or solid colors may be applied in the virtual display.

Referring to FIG. 3A, a support individual 204 and customer 202 interact across a glass or other transparent panel 206 in environment 200. The panel is or comprises a transparent display device. Individual 204 works at a desk 208 on which documents, including document(s) 210b and 210a (not depicted because it is blocked from view by a virtual display plane) are kept.

A computer system, including the transparent display device or in communication therewith and one or more input devices such as cameras and other sensors, can identify the focus direction(s) of user 202 toward the transparent display device. Focus direction represents the user's line of sight, either actual or possible given the orientation of the user's head. For instance, the user 202 may currently be looking at user 204 but, if desired, look down at sensitive content 210b. User 202's lines of sight to sensitive content 210a and 210b are denoted using dashed lines in FIG. 3A.

The system will identify the fact that user 202 could focus his/her line of sight at sensitive content 210a or 210b. Consequently, the computer system can determine a display area of the transparent display device through which given sensitive content is viewable by user 202. The system can establish in that display area a virtual display plane/area to display digital content at least partially blocking the sensitive content from view from the position of user 202 so that the physical sensitive content behind the virtual display area will not be visible. The digital content presented in the display area may be an advertisement. Referring to FIG. 3A, display area 212b of transparent display device 206 is in the user 202's line of sight to sensitive content 210b, while display area 212a is in the user 202's line of sight to sensitive content 210 (see FIG. 2). In display areas 212a and 212b, the computer system can display digital content, in some example presents with a skew to form a virtual display plane. In the example of FIG. 3A, a blur is used as the digital content to block the view to the sensitive content, however any graphical or visual element that can be depicted in a portion of a transparent display device to block the view to the sensitive content.

It is also noted that the display areas 212a, 212b in the example of FIG. 3A are rectangular in shape, however they could be other shapes and dimensions. They may conform to the shape/dimension of the sensitive content being blocked. For example, the shape and dimensioning of the display area 212a covering sensitive content 210a (FIG. 2) could be tailored to the dimensions and shape of sensitive content 210a, i.e. that of two overlapping rectangular areas, instead of a single rectangular area as shown in FIG. 3A.

Additionally or alternatively, a virtual display plane established in a display area may be presented with a skew to give it a three-dimensional appearance. That is, the virtual display plane may be oriented at an angle with respect to a surface of the physical plane of the transparent display device.

Accordingly, dimension, orientation, shape and positioning of a virtual display to cover a display area of the transparent display can be determined in such a way that the entire sensitive content can be hidden. Parameters for determining the dimension, orientation, shape and positioning of the relevant display area of the transparent display are the user's (e.g. 202 in FIG. 3A) focus direction and angle toward the transparent display, and the location/position and dimension of the sensitive content.

User focus direction/line of sight to the sensitive content is dependent on positioning of the user. In accordance with additional aspects, based on a change of position (and therefore focus direction) of the user, the relevant display area and therefore position of the virtual display will also be changed. The system can monitor for a change of position and viewing direction of a user and adjust positioning of the display area so that the digital content relocates on the transparent display to continue to block the sensitive content from view.

FIG. 3B depicts a view in environment 200 from behind user 202 looking toward the transparent display device 206. The display areas 212a and 212b are shown blocking user 202's view to sensitive content 210a and 210b (not shown in FIG. 3B) on desk 208. However, user 204 on the other side of transparent display device 206 remains visible to user 202, as the virtual display planes in areas 212a and 212b do not sit in the user 202's line of sight to user 204. In some examples, the digital content presented in display areas 212a and 212b is/are advertisement(s) viewable to user 202. As another example, the digital content may be a video stream, such as a television broadcast.

Figure 4:
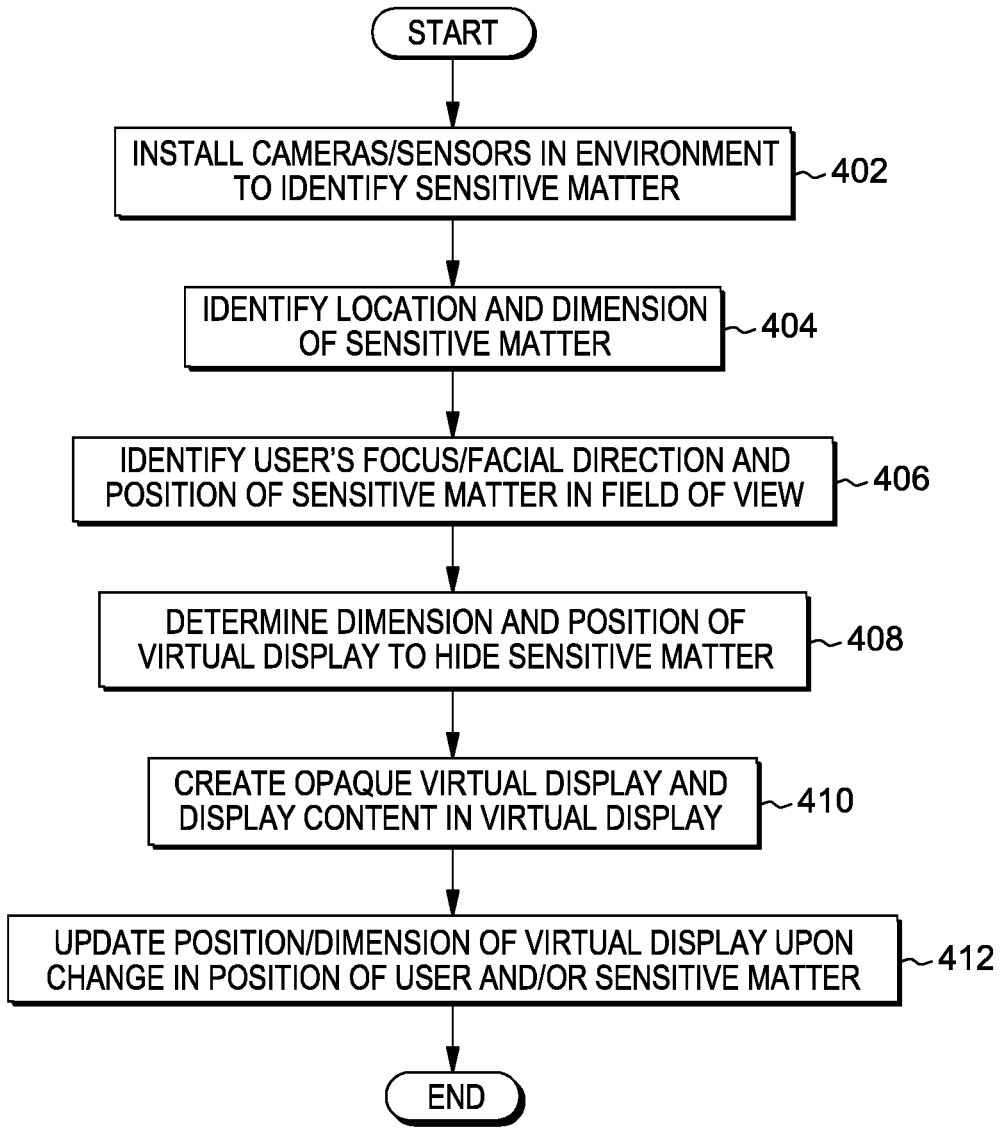
FIG. 4 depicts an example process for blocking content from view through a transparent display device, in accordance with aspects described herein.

FIG. 4 and the following description present implementation steps for a process to block content from view through a transparent display device, in accordance with aspects described herein:

Multiple cameras and different sensors (proximity, etc.) are installed in the environment to identify sensitive matter/content (objects, items, actions) adjacent to one side of the transparent display (402);

Camera(s) and/or sensor(s) will identify the location and dimension of the sensitive matter in three-dimensional space (404), for instance a distance of the content from the transparent display screen;

Camera(s) installed viewing an area adjacent to the other side of the transparent display device will identify the user's focus/facial direction and accordingly will identify the position of the sensitive content in the field of view of the user (406);

Software will determine the dimension and position of a virtual display to be established in a display area of the transparent display so as to hide the sensitive content from the user's view (408);

Software will create the opaque virtual display in the display area and display digital content (e.g. an advertisement) in the virtual display (410). The user is able to see through surrounding parts of the transparent display;

If the user changes position, or the position of the sensitive content changes, then accordingly the position and/or dimension of the virtual display area will also be changed, automatically (412) to sufficiently continue to hide the sensitive content from view.

Accordingly, camera(s) or other imaging device(s) installed in the environment can identify focus/facial direction of one or more users adjacent to one side of a transparent display and create one or more virtual opaque display screens on the transparent display to hide from view confidential material or activity adjacent to another side of the transparent display. Aspects described herein identify a display area of the transparent display, the display area corresponding to the dimension and location of the sensitive content adjacent to the other side of the display and to the user's line of sight to the sensitive content. Furthermore, digital content such as graphics are presented in the display area on a virtual display plane. The graphics may be advertisements, for instance that overlay the sensitive content in the user's or users' line(s) of sight to hide the sensitive content from user view.

In addition to the above, the location, shape and dimensions of the virtual display in the display area of the transparent display can be based on location, shape, and dimensions of the sensitive content. That is, the particular shape, location, and dimensions of the sensitive content in the user's view can be determined based on the viewing angle to the sensitive content and the characteristics of the sensitive content. The transparent display plane represents a cross-section of the user's field of view to the sensitive content, and the shape, location, and dimensions of that sensitive content as viewable on that cross-section may be determined to inform the shape, location, and dimensions of the display area to cover with digital content.

There may be multiple such display area, such as when the views of multiple users to the sensitive content are to be blocked, or when there are multiple pieces of sensitive content to hide from view. Alternatively, the virtual display may be sized to fill the entire, or most of the, transparent display.

Figure 5:
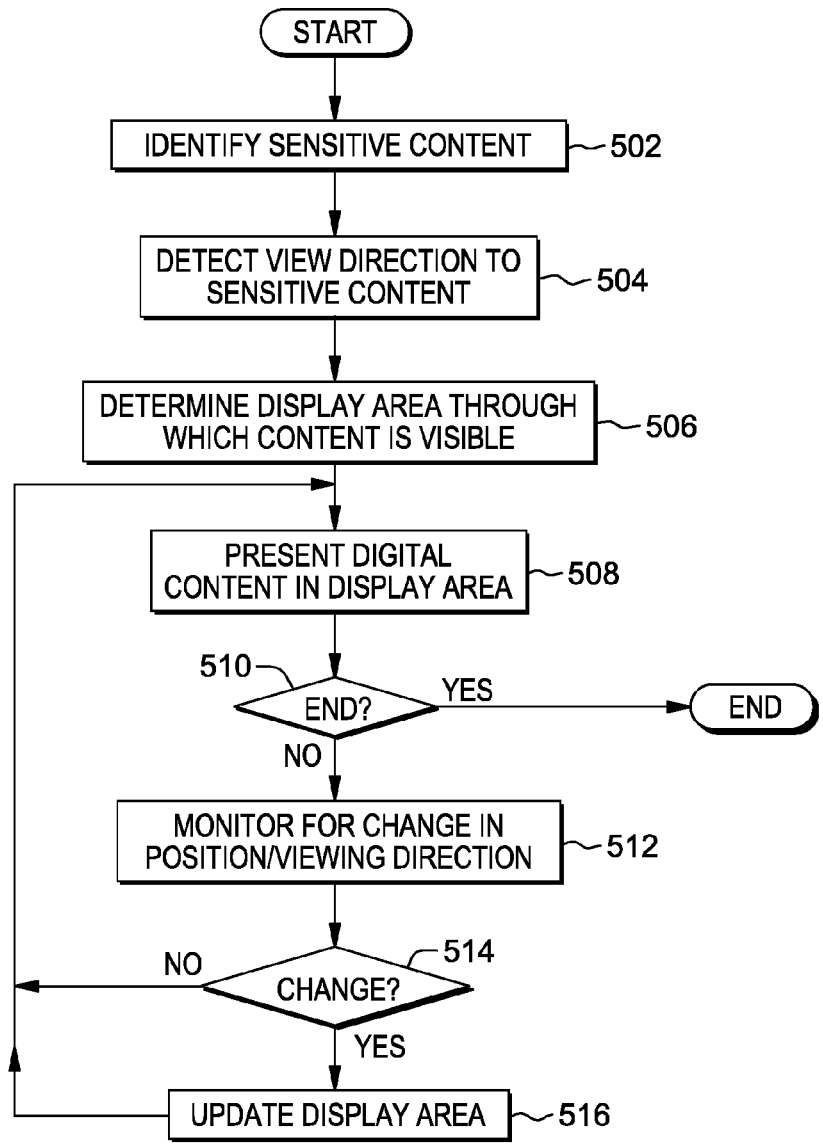
FIG. 5 depicts another example process for hiding sensitive content from view through a transparent display device, in accordance with aspects described herein.

FIG. 5 depicts another example process for hiding sensitive content from view through a transparent display device, in accordance with aspects described herein. In some examples, the process of FIG. 5 is performed by one or more computer system(s), such as a computer system comprising, or in communication with, a transparent display device, or a remote server in communication with such a computer system.

The process begins by identifying sensitive content adjacent to a first side of a transparent display device (502). In some examples, this identifying of the sensitive content includes obtaining, e.g. from one or more cameras, one or more images of a scene adjacent to the first side of the transparent display device, applying image recognition to the obtained one or more images, and identifying the sensitive content based on the applied image recognition. Additionally, identifying the sensitive content can include determining a location and dimension of the sensitive content in its position.

The sensitive content can include anything that is viewable, such as documents or other objects. Additionally or alternatively, the sensitive content includes activity by a user adjacent to the first side of the transparent display device. Identifying the sensitive content in this situation includes tracking user activity adjacent to the first side of the transparent display device and identifying at least some of the user activity as being the sensitive content.

The process continues by detecting a viewing direction to the sensitive content (504) through the transparent display device from a position adjacent to a second side of the transparent display device. The viewing direction is of a user, for example, at the position adjacent to the second side of the transparent display device. Detecting the viewing direction can include obtaining, e.g. using one or more cameras, one or more images of a scene adjacent to the second side of the transparent display device and identifying a focus direction of the user. The detecting can further include identifying a user at the position adjacent to the second side of the transparent display device (identified at least in terms of the user's privilege level to view the sensitive content). The user can have the detected viewing direction, and the process can determine a sensitivity privilege level associated with that user and whether the identified sensitive content is sensitive with respect to the determined sensitivity privilege level associated with the user. In some examples, sensitive content may be sensitive with respect to one user but not another.

Next, based at least in part on the detected viewing direction, the process determines a display area of the transparent display device through which at least a portion of the sensitive content is visible from the position adjacent to the second side of the transparent display device (506). The determining the display area can include positioning and dimensioning the display area on the transparent display based on the identified location and dimension of the sensitive content. For instance, the shape of the display area may be tailored so that it blocks the view to substantially only the sensitive content, conforming to the content's shape without blocking the view of other content around the sensitive content.

The process then presents, in the display area, digital content at least partially blocking the sensitive content from view from the position adjacent to the second side of the transparent display device (508). The digital content may be an advertisement and/or may be selected from the group consisting of: one or more images, a blur pattern, or a color, as examples. At least some portions of the transparent display device can remain transparent such that other content adjacent to a first side of a transparent display device (i.e. the with the sensitive content) remains visible through the transparent display device from the position adjacent to the second side of the transparent display device.

The process determines whether to halt (510) and if not continues by monitoring for a change of position and viewing direction of a user at the position adjacent to the second side of the transparent display device and/or position of the sensitive content (512). The process determines whether a change was detected (514), and if so updates the display area (516), for example by adjusting positioning of the display area so that the digital content continues to at least partially block the sensitive content from view. Then, or if no change was detected (at 514), the process returns to 508 where the digital content is presented in the display area.

The display area includes a first display area. In additional processing, the process can detect one or more other viewing directions to the sensitive content through the transparent display device from one or more other positions adjacent to the second side of the transparent display device. Based at least in part on the detected one or more other viewing directions, the process can determine second display areas of the transparent display device through which the sensitive content is viewable from the one or more other positions adjacent to the second side of the transparent display device, and present, in the second display areas, additional digital content (which may be the same or different content) at least partially blocking the sensitive content from view from the one or more positions adjacent to the second side of the transparent display device.

Processes described herein may be performed singly or collectively by one or more computer systems, such as computer system(s) described below with reference to FIG. 6. In some embodiments, such a computer system may be, include, or be incorporated into a transparent display device.

Figure 6:
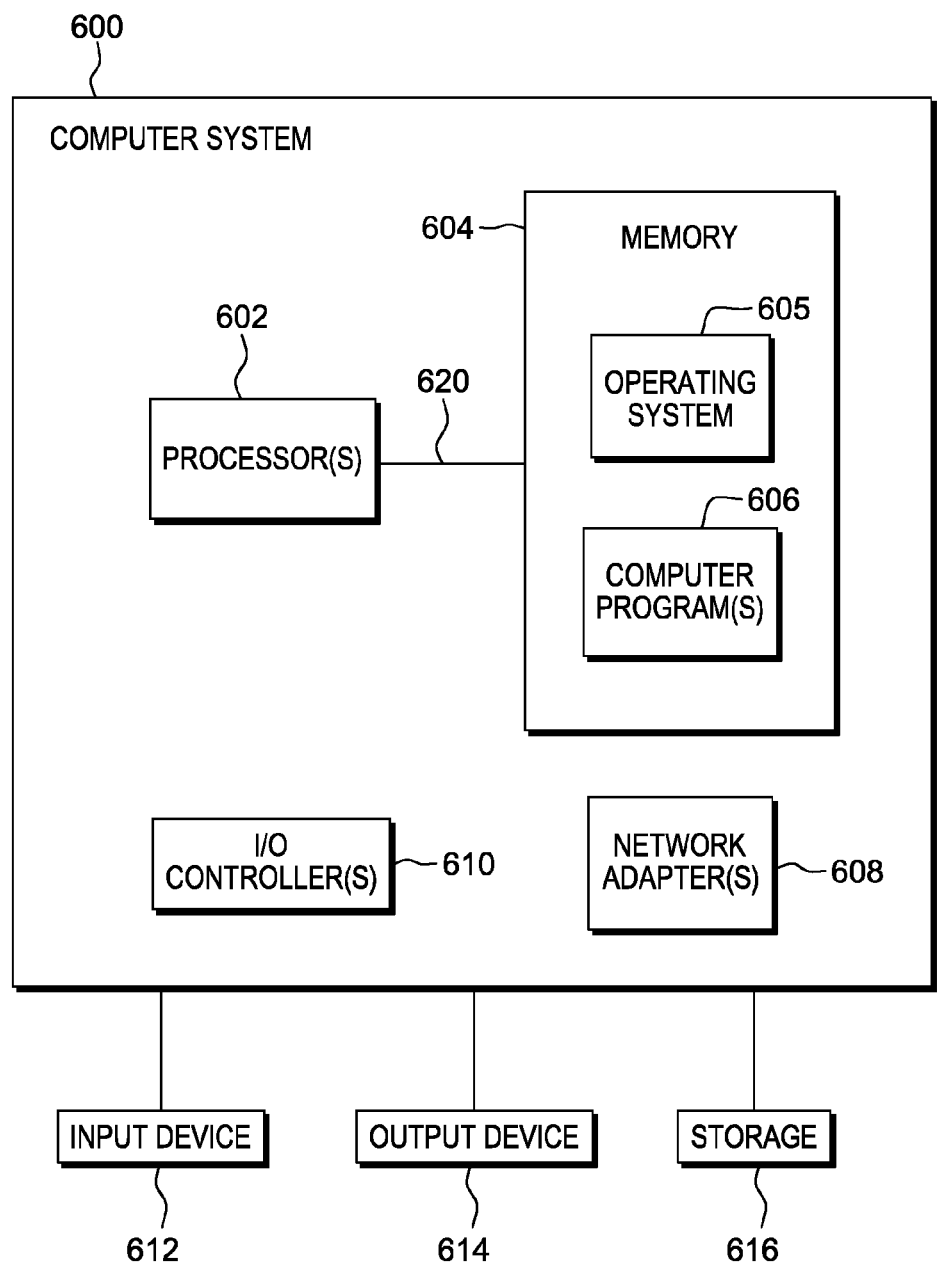
FIG. 6 depicts an example of a computer system to incorporate or use aspects described herein.

FIG. 6 depicts one example of a computer system to incorporate or use aspects described herein. A computer system may also be referred to herein as a data processing device/system or computing device/system, or simply a computer. Computer system 600 may be based on one or more of various system architectures such as those offered by International Business Machines Corporation (Armonk, N.Y., USA), Intel Corporation (Santa Clara, Calif., USA), or ARM Holdings plc (Cambridge, England, United Kingdom), as examples.

Computer system 600 is suitable for storing and/or executing program code and includes at least one processor 602 coupled directly or indirectly to memory 604 through, e.g., a system bus 620. In operation, processor(s) 602 obtain from memory 604 one or more instructions for execution by the processors. Memory 604 may include local memory employed during actual execution of the program code, bulk storage, and cache memories which provide temporary storage of at least some program code in order to reduce the number of times code must be retrieved from bulk storage during program code execution. A non-limiting list of examples of memory 604 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 604 includes an operating system 605 and one or more computer programs 606 to perform aspects described herein, such as those described with reference to FIGS. 4 and 5, as examples.

Input/Output (I/O) devices 612, 614 (including but not limited to conventional displays, transparent or see-through displays, microphones, speakers, accelerometers, gyroscopes, magnetometers, light sensors, proximity sensors, GPS devices, cameras, etc.) may be coupled to the system either directly or through I/O controllers 610.

Network adapter(s) 608 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 608 used in computer systems.

Computer system 600 may be coupled to storage 616 (e.g., a non-volatile storage area, such as magnetic disk drives, optical disk drives, a tape drive, etc.), having one or more databases. Storage 616 may include an internal storage device or an attached or network accessible storage. Computer programs in storage 616 may be loaded into memory 604 and executed by a processor 602 in a manner known in the art.

The computer system 600 may include fewer components than illustrated, additional components not illustrated herein, or some combination of the components illustrated and additional components. Computer system 600 may include any computing device known in the art, such as a mainframe, server, personal computer, workstation, laptop, handheld or mobile computer, tablet, wearable device, telephony device, network appliance (such as an edge appliance), virtualization device, storage controller, etc.

Figure 7:
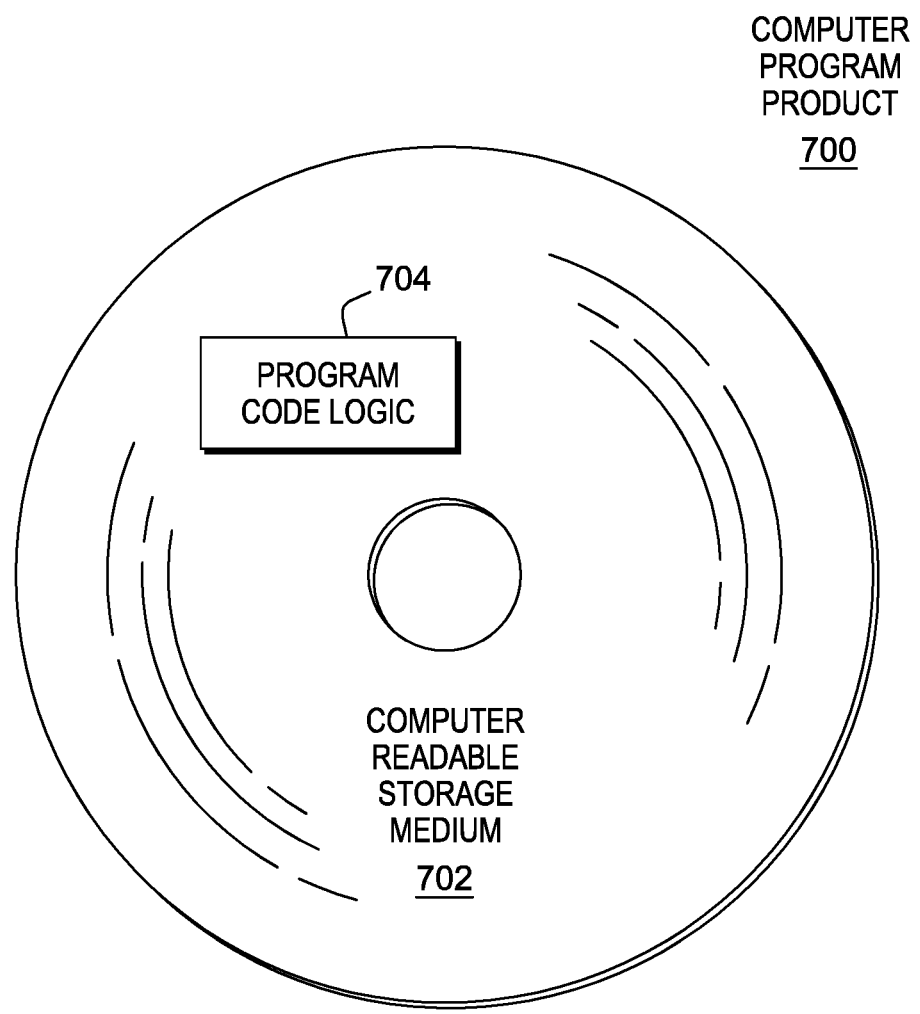
FIG. 7 depicts one embodiment of a computer program product.

Referring to FIG. 7, in one example, a computer program product 700 includes, for instance, one or more computer readable storage media 702 to store computer readable program code means, logic and/or instructions 704 thereon to provide and facilitate one or more embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   identifying, by a computer system, sensitive content adjacent to a first side of a transparent display device, wherein the identifying the sensitive content comprises: using one or more cameras of the computer system to obtain one or more images of a scene adjacent to the first side of the transparent display device, applying image recognition to the obtained one or more images, and identifying the sensitive content based on the applied image recognition;
   detecting, by the computer system, a viewing direction to the sensitive content through the transparent display device from a position adjacent to a second side of the transparent display device;
   determining, by the computer system, based at least in part on the detected viewing direction, a display area of the transparent display device through which at least a portion of the sensitive content is visible from the position adjacent to the second side of the transparent display device; and
   presenting, by the computer system, in the display area, digital content at least partially blocking the sensitive content from view from the position adjacent to the second side of the transparent display device.

2. The method of claim 1, wherein the identifying the sensitive content comprises determining a location and dimension of the sensitive content, and wherein the determining the display area comprises positioning and dimensioning the display area based on the identified location and dimension of the sensitive content.

3. The method of claim 1, wherein the identifying the sensitive content comprises tracking user activity adjacent to the first side of the transparent display device and identifying at least some of the user activity as being the sensitive content.

4. The method of claim 1, wherein the viewing direction is of a user at the position adjacent to the second side of the transparent display device, and the detecting the viewing direction comprises obtaining one or more images of a scene adjacent to the second side of the transparent display device and identifying a focus direction of the user.

5. The method of claim 1, further comprising identifying a user at the position adjacent to the second side of the transparent display device, the user having the detected viewing direction, determining a sensitivity privilege level associated with the user, and determining whether the identified sensitive content is sensitive with respect to the determined sensitivity privilege level associated with the user.

6. The method of claim 1, further comprising monitoring for a change of position and viewing direction of a user at the position adjacent to the second side of the transparent display device, and adjusting positioning of the display area so that the digital content continues to at least partially block the sensitive content from view.

7. The method of claim 1, wherein the digital content is selected from the group consisting of: one or more images, a blur pattern, or a color.

8. The method of claim 1, wherein the digital content comprises an advertisement.

9. The method of claim 1, wherein at least some portions of the transparent display device remain transparent and other content adjacent to a first side of a transparent display device remains visible through the transparent display device from the position adjacent to the second side of the transparent display device.

10. The method of claim 1, wherein the display area comprises a first display area, and wherein the method further comprises:
    detecting one or more other viewing directions to the sensitive content through the transparent display device from one or more other positions adjacent to the second side of the transparent display device;
    determining, based at least in part on the detected one or more other viewing directions, second display areas of the transparent display device through which the sensitive content is viewable from the one or more other positions adjacent to the second side of the transparent display device; and
    presenting, in the second display areas, additional digital content at least partially blocking the sensitive content from view from the one or more positions adjacent to the second side of the transparent display device.

11. A computer program product comprising:
    a computer readable storage medium readable by a processor and storing instructions for execution by the processor for performing a method comprising:
        identifying, by a computer system, sensitive content adjacent to a first side of a transparent display device, wherein the identifying the sensitive content comprises: using one or more cameras of the computer system to obtain one or more images of a scene adjacent to the first side of the transparent display device, applying image recognition to the obtained one or more images, and identifying the sensitive content based on the applied image recognition;
        detecting, by the computer system, a viewing direction to the sensitive content through the transparent display device from a position adjacent to a second side of the transparent display device;
        determining, by the computer system, based at least in part on the detected viewing direction, a display area of the transparent display device through which at least a portion of the sensitive content is visible from the position adjacent to the second side of the transparent display device; and
        presenting, by the computer system, in the display area, digital content at least partially blocking the sensitive content from view from the position adjacent to the second side of the transparent display device.

12. The computer program product of claim 11, wherein the identifying the sensitive content comprises tracking user activity adjacent to the first side of the transparent display device and identifying at least some of the user activity as being the sensitive content.

13. The computer program product of claim 11, wherein the viewing direction is of a user at the position adjacent to the second side of the transparent display device, and the detecting the viewing direction comprises obtaining one or more images of a scene adjacent to the second side of the transparent display device and identifying a focus direction of the user.

14. The computer program product of claim 11, wherein the method further comprises identifying a user at the position adjacent to the second side of the transparent display device, the user having the detected viewing direction, determining a sensitivity privilege level associated with the user, and determining whether the identified sensitive content is sensitive with respect to the determined sensitivity privilege level associated with the user.

15. The computer program product of claim 11, wherein the method further comprises monitoring for a change of position and viewing direction of a user at the position adjacent to the second side of the transparent display device, and adjusting positioning of the display area so that the digital content continues to at least partially block the sensitive content from view.

16. A computer system comprising:
    a memory; and
    a processor in communications with the memory, wherein the computer system is configured to perform a method, the method comprising:
        identifying, by the computer system, sensitive content adjacent to a first side of a transparent display device, wherein the identifying the sensitive content comprises: using one or more cameras of the computer system to obtain one or more images of a scene adjacent to the first side of the transparent display device, applying image recognition to the obtained one or more images, and identifying the sensitive content based on the applied image recognition;
        detecting, by the computer system, a viewing direction to the sensitive content through the transparent display device from a position adjacent to a second side of the transparent display device;
        determining, by the computer system, based at least in part on the detected viewing direction, a display area of the transparent display device through which at least a portion of the sensitive content is visible from the position adjacent to the second side of the transparent display device; and
        presenting, by the computer system, in the display area, digital content at least partially blocking the sensitive content from view from the position adjacent to the second side of the transparent display device.

17. The computer system of claim 16, wherein the identifying the sensitive content comprises tracking user activity adjacent to the first side of the transparent display device and identifying at least some of the user activity as being the sensitive content.

18. The computer system of claim 16, wherein the method further comprises identifying a user at the position adjacent to the second side of the transparent display device, the user having the detected viewing direction, determining a sensitivity privilege level associated with the user, and determining whether the identified sensitive content is sensitive with respect to the determined sensitivity privilege level associated with the user.

19. The computer system of claim 16, wherein the method further comprises monitoring for a change of position and viewing direction of a user at the position adjacent to the second side of the transparent display device, and adjusting positioning of the display area so that the digital content continues to at least partially block the sensitive content from view.

* * * * *